United States Patent Office 3,444,115
Patented May 13, 1969

3,444,115
POLYOLEFIN-WHITE PIGMENT COMPOSITION STABILIZED WITH MIXTURES OF A FATTY ACID AND AN ULTRAVIOLET LIGHT STABILIZER
Donald G. Needham, Ramona, and George R. Hill, Bartlesville, Okla., assignors to Phillips Petroleum Company, a corporation of Delaware
No Drawing. Filed June 25, 1965, Ser. No. 467,135
Int. Cl. C08f 45/04, 45/58
U.S. Cl. 260—23    2 Claims

ABSTRACT OF THE DISCLOSURE

Polymeric compositions free from discoloration are provided by the addition of an inhibiting amount of a long chain fatty acid to the pigmented polymer.

---

This invention relates to a novel stabilized polymeric composition and a method of stabilizing same. In one aspect, this invention relates to color stabilized polymers. In another aspect, this invention relates to polymer compositions of 1-olefins in which discoloration is inhibited. A further aspect of this invention relates to a method of inhibiting discoloration in polymers.

Polymers of 1-olefins, such as polyethylene and polypropylene, are suitable for many uses. When such materials are to be used outdoors, it is generally preferred to add an ultraviolet light absorber to the polymer so as to extend the outdoor life thereof. However, where a white polymer is desired for outdoor use, difficulty is encountered since there is apparently a reaction between the conventionally employed white pigment-titanium dioxide and the ultraviolet light absorber. The resulting composition turns to a cream colored off-white.

It is thus an object of this invention to provide a color-stable white polyolefin composition.

Another object of this invention is to provide a method for inhibiting discoloration in polymers of 1-olefins.

Other aspects, objects and the several advantages of this invention will be apparent from the following specification and claims.

In accordance with this invention, we have discovered that conventionally prepared white polymers of 1-olefins can be rendered stable to discoloration by incorporating therein a long chain fatty acid having 10 to 24 carbon atoms.

The term "ultraviolet stabilizers" as employed herein is intended to include all known ultraviolet stabilizers known in the art which are effective in white polymer compositions and includes preferably 2 - hydroxy - 4 - n-octoxybenzophenone. Other compounds which are useful are phenol-nickel complexes, phenyl salicylates, alkyl phenyl salicylates, benzotriazoles, 2,4-di-hydroxybenzophenone, 2-hydroxy-4-methoxybenzophenone, and the like.

In addition, the composition can also contain other ingredients normally employed to give desirable properties to the resulting polymer. Such ingredients include antistatic agents, antioxidants, crystallization modifiers, lubricants, dispersing agents, fillers and pigments, and the like.

The following example is presented to further illustrate the invention:

Example

A series of compositions were prepared by simultaneously milling on a roll mill at 300° F. for a period of 10 minutes a polyethylene polymer, 2 weight percent titanium dioxide, .1 weight percent of a fatty acid and an ultraviolet stabilizer. The following results were obtained:

| Run | Polymer | UV stabilizer | TiO$_2$, percent | Fatty acid | Color |
|---|---|---|---|---|---|
| 1 | Polyethylene [1] | UV 531 [2] | 2 | None | Yellow. |
| 2 | do | UV 531 [2] | 2 | Stearic | White. |
| 3 | do | UV 531 [2] | 2 | Heptadecanoic | Very white. |

[1] Ethylene-butene-1 copolymer produced by a solution process containing about 5% butene-1, having a density of 0.95 and a melt index of .2.
[2] 2-hydroxy-4-n-octoxybenzophenone.

The above data clearly demonstrate that adverse color development in white pigmented polymer is achieved by the incorporation of the fatty acid into the polymeric composition.

The long chain fatty acid can be present in an amount in the range of 0.01 to 1.0 percent and preferably about 0.1 percent.

Polymers capable of being inhibited in accordance with this invention are those of mono-1-olefins having 2 to 8 carbon atoms and which are generally formed in a manner known in the art. Polymers such as prepared in accordance with Hogan et al., U.S. Patent 2,825,721, are preferred as well as copolymers thereof such as ethylene-butene-1.

Additives suitable for inhibiting the discoloration of the polymers are monobasic long chain fatty acids containing 10 to 24 carbon atoms. Examples of such compounds include capric, stearic, lauric, lignoceric, palmitic, decylenic, dodecylenic, nervonic, linolenic, oleic acid, and the like.

While any conventional ultraviolet stabilizer can be employed in the polyolefin compositions, it has been found in accordance with this invention that maximum inhibitation of discoloration of pigmented polymer is achieved in these compositions where 2-hydroxy-4-n-octoxybenzophenone is the stabilizer.

Reasonable variations and modifications of this invention can be made, or followed, in view of the foregoing, without departing from the spirit or scope thereof.

We claim:
1. A stabilized white pigment containing polymeric composition free from discoloration comprising (a) a polymer of a mono-1-olefin having 2 to 8 carbon atoms, (b) an ultraviolet light stabilizer, (c) from 0.01 to 1.0 weight percent of the polymer present of a monobasic long chain fatty acid containing 10 to 24 carbon atoms and (d) a white pigment.

2. A composition according to claim 1 wherein said polymer is polyethylene, said white pigment is titanium oxide, said monobasic long chain fatty acid is stearic acid and said ultraviolet light stabilizer is 2-hydroxy-4-n-octoxybenzophenone.

References Cited

UNITED STATES PATENTS

| | | | |
|---|---|---|---|
| 2,462,331 | 2/1949 | Myers | 260—23 |
| 2,655,492 | 10/1953 | Young et al. | 260—23 |
| 2,708,215 | 5/1955 | Kaganoff | 260—23 |
| 3,017,238 | 1/1962 | Levine et al. | 260—23 |
| 3,188,298 | 6/1965 | Williamson et al. | 260—45.85 |
| 3,324,060 | 6/1967 | Scopp et al. | 260—23 |
| 3,325,441 | 6/1967 | McNally et al. | 260—41 |

OTHER REFERENCES

Martinovich, Plastics Technology, "Better Polyolefin UV. Resistance," vol. 9, November 1963, pages 45 and 46.

DONALD E. CZAJA, *Primary Examiner.*

R. A. WHITE, *Assistant Examiner.*

U.S. Cl. X.R.

260—41, 45.75, 45.8, 45.85, 45.95